UNITED STATES PATENT OFFICE.

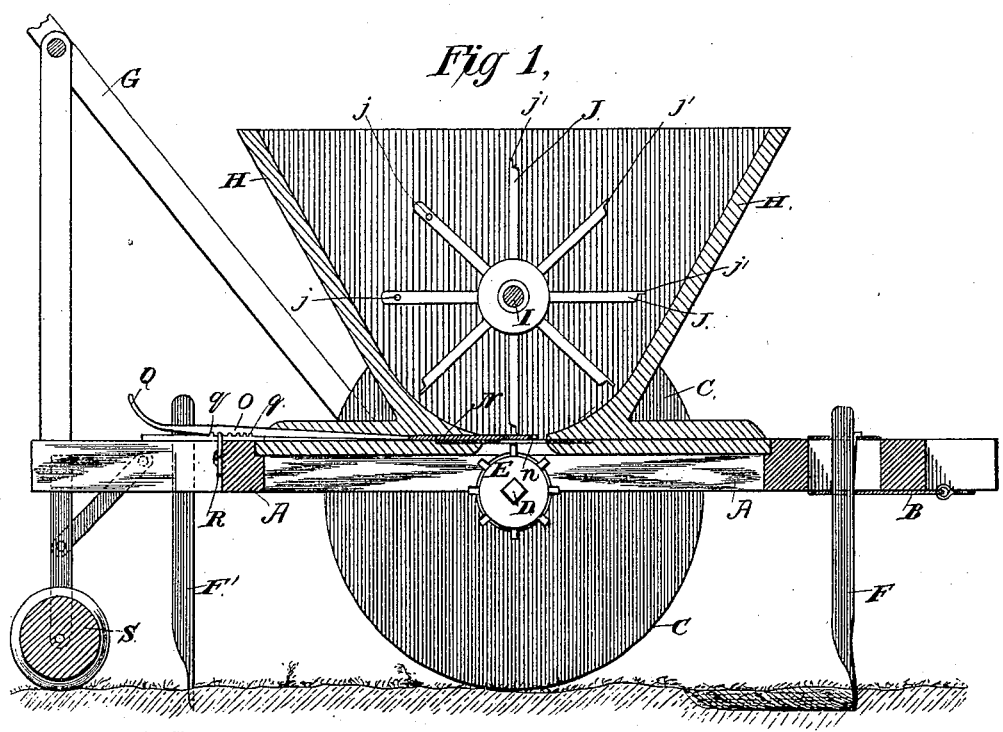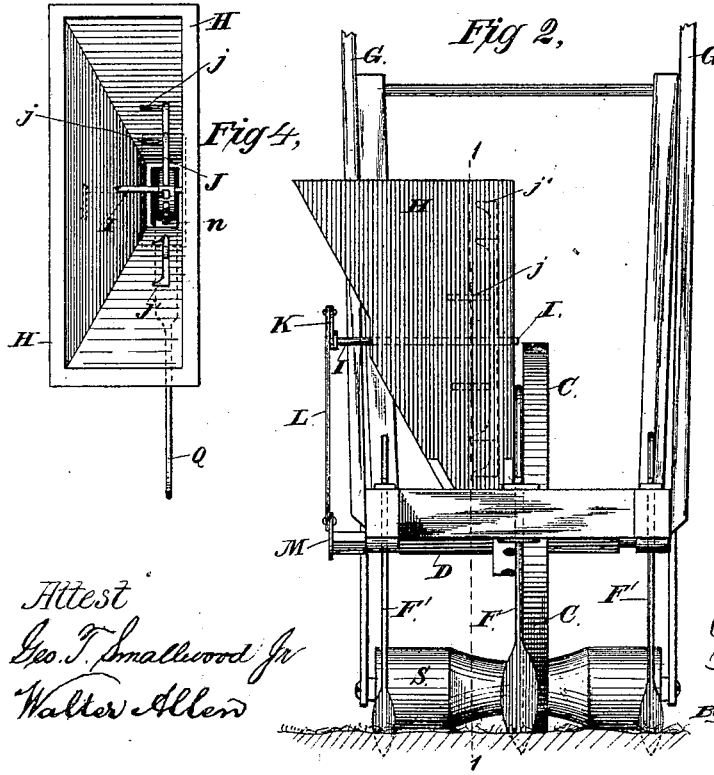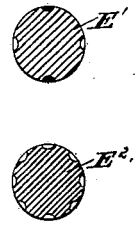

ORRICK J. MURRAY AND HENRY KEATING, OF MILLEDGEVILLE, GEORGIA.

COMBINED SEED-PLANTER AND GUANO-DISTRIBUTER.

SPECIFICATION forming part of Letters Patent No. 245,546, dated August 9, 1881.

Application filed February 24, 1880. (Model.)

*To all whom it may concern:*

Be it known that we, ORRICK JACKSON MURRAY and HENRY KEATING, both citizens of the United States, residing at Milledgeville, in the county of Baldwin and State of Georgia, have invented an Improved Combined Seed-Planter and Guano-Distributer, of which the following is a specification.

Our improvement consists in combining a wheel of spokes having horizontal stud-pins for sweeping over the bottom of the hopper, and beaters for loosening the seed, with a rock-shaft by which the wheel is vibrated, a hopper for receiving the seed, and crank-arms, rod, and shaft for connection to the ground-wheel, as hereinafter described.

In order that our invention may be fully understood, we will proceed to describe it with reference to the accompanying drawings, in which—

Figure 1 is a longitudinal section on the line 1 1, Fig. 2. Fig. 2 is a front view. Fig. 3 is a detached view of measuring-wheels with different numbers of cups. Fig. 4 is a top view of the vibrating wheel of spokes in the hopper, and exhibiting the notched seed-slide.

A A are different parts of the frame of the planter; B, the draw-bar; C, the ground-wheel, and D the shaft thereof.

E is a toothed wheel for discharging cotton-seed from the hopper.

E' E² are measuring-wheels having different numbers of measuring-cups applied equidistantly around their peripheries, for dropping corn, pease, or other seeds at different distances, as required. Any one of the said wheels is applied to the shaft D. They are readily changed by detaching the shaft or axle from the frame. A single wheel may be used for dropping corn, pease, or other large seeds from eighteen inches to six feet apart. Supposing four holes to be arranged for eighteen-inch distances, two opposite holes are stopped for dropping at three-feet distances, and all the holes but one for dropping at six feet apart.

F is a furrow-opener; F' F', coverers, and G G, handles of ordinary construction.

H is the seed-hopper, within which is a horizontal rock-shaft, I, on which is mounted a wheel of spokes, J, armed with horizontal stud-pins $j\ j$, for sweeping over the bottom of the hopper, and beaters or paddles $j'\ j'$, for keeping the seeds loose and preventing their clogging. This rock-shaft has a crank-arm, K, which is connected by a rod, L, with an arm, M, on the shaft, D, the parts being so proportioned that the continuous rotation of the ground-wheel C will impart a vibratory motion to the rock-shaft I. In the bottom of the hopper H is a slide, N, formed with a recess or excavation, $n$, to furnish a small orifice through the slide when desired, and operated by a rod, O, furnished with a handle, Q, which may be fixed in any position by a catch, R, of any suitable construction to admit of closing the opening in the hopper-bottom completely when the discharge of seed is to be stopped by regulating the capacity of the opening as required, a number of notches, $q$, being provided in the handle Q for the purpose.

S is a roller having a wide groove at its central part, adapting it, while pressing the earth on the seed, to form a ridge, on the summit of which the plants will grow so as to be removed from danger of injury from cultivation while small, and be better adapted for chopping out.

The machine, though primarily intended for planting cotton-seed, is well adapted for planting corn, pease, and other large seeds, also for small seeds of any or all kinds, and for distributing guano and other fertilizers in any quantities, from the smallest to the largest amount required. It is especially valuable as a cotton-planter by reason of the uniform distribution insured by the wheel of spokes and beaters and the toothed wheel E, which latter works in the throat of the hopper and drags the seed out, and thus prevents clogging and missing, which are liable to cause irregularity in the work of cotton-planters in common use.

We are aware that the devices employed in our machine separately considered are not new, and we do not therefore claim them broadly; but our improved planter consists in the arranging and the combining of the various parts in such a manner as to produce a compact and useful machine.

Having thus described our invention, the following is what we claim as new and desire to secure by Letters Patent—

The wheel of spokes J, armed with horizontal pins $j\ j$, for sweeping over the bottom of the hopper, and the beaters $j'\ j'$, for loosening the seeds, in combination with the rock-shaft I, hopper H, crank-arms K M, rod L, shaft D, and ground-wheel C, all constructed and arranged substantially as set forth.

O. J. MURRAY.
HENRY KEATING.

Witnesses:
HENNING G. GRIEVE,
L. J. LAMAR.